Patented Feb. 20, 1940

2,190,853

UNITED STATES PATENT OFFICE 2,190,853

CONDITIONING WATER

William Vaughan, Mount Holly, N. J., assignor to The Permutit Company, New York, N. Y., a corporation of Delaware No Drawing. Application May 13, 1935, Serial No. 21,275

15 Claims. (Cl. 210—24)

This invention relates to a method of and material for conditioning water; and it comprises a process of removing cations, such as sodium, from water, wherein water containing a salt is passed in contact with extensive surfaces of granulated, acid-extracted lignite, the lignite being occasionally regenerated by extraction with dilute acid solution; all as more fully hereinafter set forth and as claimed.

Hard water ordinarily contains dissolved calcium and magnesium salts; the calcium salts generally predominating. Calcium bicarbonate is responsible for so-called temporary hardness. Conventional methods for softening hard water usually involve substituting an equivalent amount of sodium for the calcium and magnesium. In base exchange softening with zeolites, for instance, the hard water is passed through a bed of zeolites containing sodium as exchangeable ion. The zeolites extract calcium and magnesium from and give up an equivalent amount of sodium to the water. When the zeolites are exhausted, they are regenerated by passing brine over the granules.

In many cases, the fact that the softened water contains sodium is not deleterious, and it may be an advantage. But for some purposes it is desirable to obtain water free from all salts. In the present invention, hard water containing calcium bicarbonate or magnesium bicarbonate can be directly freed of its cations and converted into cation free water. But the method is particularly applicable to removing the sodium cation from artificially softened water.

In the prior art (see McElroy No. 1,811,587) are described processes of producing a softened mineral-free water from water containing cations, wherein water is flowed in contact with various granular silicious materials, such as baked clay. The silicious material is used to remove cations from the water until its cation-removing power is exhausted or unduly lessened and is then regenerated with acid.

These cation extracting methods, using various granular silicates, are useful and effective, but such silicates are open to the objection of short life, making servicing unduly expensive. Moreover, their effective capacity, in service, is rather low, either on a weight basis or a volume basis. The short life and deterioration of exchange capacity are inevitable, since there is practically no known silicate material which will long withstand the alternate action of acid and of a mildly alkaline water; either hard water or that produced in softening operations. None of them combines physical ruggedness and resistance to acid attack, with a good exchange capacity in substituting the H ion for the basic ion. The granules shatter and lose weight. As a general rule, capacity must be sacrificed for ruggedness; but no silicate is very rugged under the conditions.

I have found that much better materials for complete cation extraction, combining high capacity, either on a weight or a volume basis of comparison, with stability in the sense of withstanding indefinitely the alternate actions described, can be produced from lignites. Lignite or brown coal, as it is sometimes called, is a natural material containing humins or humic components. Very many other humic materials may be used; the series including brown coal, or lignite, and running to fibrous peat at one extreme and bituminous, or soft coal, at the other. Soft coal is, of course, readily obtained commercially. I regard as the best material for my purposes, the lignites or brown coals.

Some natural lignites or brown coals may be used directly after granulation and an acid wash. Others can be processed with advantage prior to use to enhance their physical strength, to give granules of the proper kind and to prevent their yielding color to water. Lignite and brown coal, as they are sold for fuel purposes are frequently processed; sometimes by briquetting or nodulizing and baking, sometimes by a treatment with high pressure steam, etc. With extensively hydrated, readily shattering forms of lignite, such as some of the South Dakota lignites, the steam process is particularly advantageous. With fine lignites, and other humic substances not in sufficiently good physical form, suitable materials for the present purposes can be made by making plastic with a little silicate of soda, or some such bonding material, extruding the paste as strings, breaking up to granule size and baking at 200° or 300° C., or treating in an atmosphere of steam at a temperature above 100° C.

The point is to obtain a physically strong granule containing the humic matter of lignite, etc., in a substantially unaltered chemical form and having its original chemical reactivity. While these lignite preparations are resistant to alternate treatments with acid and alkaline water, it is necessary also to have mechanical ruggedness; resistance against abrasion. And the greater the mechanical strength which can be given the lignite granules, other things being equal, the better. But, as stated, some natural lignites are suitable and most of the lignite preparations commercially sold as fuel are also directly usable.

The lignite used in the present invention should be a preparation that is physically hard and permanent; is physically rugged. It may or may not be porous. Sometimes, high porosity is desirable in a base-removing equipment where slow action is permissible and is wanted, while the reverse is true, that a relatively less porous lignite is better where quick action is wanted. A highly porous material offers a great area of surface, but time must be given in removing base, in washing and in regenerating to render the interior surfaces available.

In the present invention, a suitable, physically strong, granulated lignite is exhaustively washed and extracted with a dilute acid, such as a 5 per cent sulfuric acid solution. This not only puts the lignite in condition to remove cations from solution, but it has the further object of removing acid-soluble bodies. Many of the lignites desirable for the present purposes are quite high in ash and contain a considerable amount of basic material going into solution with acid. Extraction with acid is therefore nearly always necessary as a preliminary treatment.

In utilizing granular lignite for the present purposes, a granular bed may be established and maintained in a suitable acid resistant container when purification is to be in downflow. If upflow passage of water is desirable, the granular material is used as a more or less loose body. With downflow operation, it is in general advisable to employ an occasional backwash flow of water to get rid of filtered solids. The more efficiently the water is filtered prior to removing cations, the less often it is necessary to backwash. In upflow, backwashing in this sense is not necessary. A lignite suitable for the present purposes will withstand the abrasion incident to upflow operation. In downflow, there is much less abrasion, in any event.

In the ordinary routine of operation, the water, which may be naturally hard water or artificially softened water, is passed in flowing contact with extensive surfaces of the acid extracted lignite until the cation removing power ceases or diminishes unduly. With a rather porous lignite, the "cut off" at the time of exhaustion is not as sharp as it is with a less porous lignite.

When exhaustion is reached, the flow of water is cut off and after a backwash, if necessary, the bed is treated with a slow flow of a dilute solution of any convenient acid. Sulfuric acid and hydrochloric acid are both suitable, the latter being better. A wide range of strength is available but, as a rule, a solution containing from 1 to 5 per cent actual acid, either sulfuric acid or hydrochloric acid, works well. After regeneration by removal of accumulated basic ions by the acid, the bed is rinsed with one or two changes of water and is then ready for reuse. Weak acids like acetic acid can be used for special purposes.

In the present process, the acid regenerated lignite may be regarded as what is known as a "hydrogen zeolite"; it contains H as an exchangeable or replaceable ion. This H ion is exchangeable, as stated, for the sodium ion, the calcium ion or the magnesium ion. The present process is particularly suitable for treating zeolite softened water removing the sodium and giving water free of, or low in contained mineral matter, that is, lessening the total solids content of the water.

The acid extraction of the lignite appears to have a stabilizing effect on it; it is more resistant to the physical actions in flowing water through it than the unextracted lignite. This stabilization occurs with both hydrochloric acid and sulfuric acid.

Various chemical treatments of the lignite may be used to secure further stabilization and with some lignites, these treatments are advantageous. The lignite may, for example, be treated with aluminum sulfate, with chromium sulfate, etc., etc., prior to the acid leach.

In a specific embodiment of the present invention, a bed of selected, steam-dried, acid-leached Dakota lignite granulated in a size range between 10 and 40 mesh, was employed. Well water containing 136 parts hardness per million, expressed as calcium carbonate, was passed through the bed. The water was thereby softened and was also freed of dissolved mineral matter. The bed removed 6374 grains of hardness per cubic foot of lignite. At the end of the softening run, the bed was regenerated by passing a solution of hydrochloric acid of 0.15 per cent HCl in an amount 1.3 times that theoretically required to dissolve the cations taken up in the softening run. The bed was then rinsed with water. In a second softening run, the same well water was passed through the bed and 6050 grains of hardness as calcium carbonate were taken up per cubic foot of material in the bed. The effluent water in this case had a pH between 3 and 4. No noticeable color was imparted to the water.

In a second example of a specific embodiment of the invention, a steam-dried Dakota lignite was granulated and screened to get a fairly uniform granule size of about 20 to 40 mesh. The sized granules were digested in a 5 per cent sulfuric acid solution for about three hours, at a temperature of about 212° F., the granules being agitated occasionally to bring the acid into thorough contact with the granulated material. The granules were then drained and washed thoroughly. It was found that the loss in weight was about 3 per cent. In using granules of lignite so treated in apparatus of the general type of the usual softener to remove soda from a water which had previously been softened in an ordinary zeolite softener to zero hardness, and which contained 583 parts soda (as bicarbonate) per million (an exceptionally high proportion), the solids in the water were reduced to an average of about 20 parts per million. The run was stopped when the effluent contained about 30 parts soda per million. During the greater portion of the run the effluent from the softener contained less than 5 parts per million of soda. The bed was regenerated with a 4.5 per cent solution of hydrochloric acid. Excess acid was rinsed from the bed. In a subsequent softening run the bed showed an alkalinity removal capacity substantially as high as the original value. In the subsequent run, when the same quantity of water had been passed through the bed, the final effluent contained about 30 parts soda per million as in the first run.

A similar run, treating water containing 7 grains hardness (as calcium carbonate) per gallon and 103 parts soda alkalinity (as sodium bicarbonate) per million, gave results equivalent to the example ante.

The cation removing function of the lignite preparations and similar humic preparations as described is sufficiently energetic to permit removal of cations from weak solutions of the salts of the strong acids; with sodium sulfate, for instance, it extracts sodium and sets free sulfuric acid.

This property makes it possible to charge the lignite with various materials, such as chromium oxid, for example, in a condition by which they are not removed by the acid regeneration. Charging the lignite with a sesquioxid of the group consisting of $Fe_2O_3$, $Al_2O_3$ and $Cr_2O_3$ used as sulfate is sometimes advantageous. Chromium oxid has been found to be a particularly advantageous material, as giving greater ruggedness to the lignite and even an enhanced activity.

A great further advantage of cation removing materials under the present invention is that they do not institute a silica equilibrium in the water. Most water passed through a silicate, either in base removal or in base exchange comes to a silica equilibrium; if low in silica it takes silica away from the silicate. With the present materials, a water low in silica does not acquire further silica in going through the lignite.

Another substantial advantage of the present material is that after the acid regeneration a substantially less volume of wash water is required to remove the acid than is the case with silicious base removing bodies. Less of the flowing water in the system is discarded as wash water.

In boiler work, it is not considered desirable to have a make-up water wholly free of salines, since it is more aggressive to hot metal. A small amount of saline matter is considered advantageous, the optimum amount being very small. Sodium sulfate is considered the best saline and in some cases, in artificially softened water containing both sodium carbonate and sodium sulfate, the former is converted into sulfate by additions of sulfuric acid. This is an inconvenient method of operating and, moreover, the final amount of salines is often rather greater than is wanted. In make-up water, while there should be some saline matter present, any large amount builds up the saline concentration in the boiler.

The present invention lends itself to the production of make-up water containing but a small amount of saline; this saline being sodium sulfate. One portion of a softened water containing both sodium sulfate and sodium carbonate is passed over granular lignite in the way described, thereby abstracting all the cation and leaving free sulfuric acid in solution. With the effluent water is united the reserved portion of the softened water in the amount in which the sulfuric acid of the one portion balances the sodium carbonate of the other portion. The result is a body of water particularly adapted for make-up use, as it contains but little saline matter and that saline matter is sodium sulfate.

A simpler but less positive method of treating boiler feed water is to regenerate the lignite with an acid solution containing common salt. This gives a lignite preparation containing both exchangeable sodium and exchangeable H ions, a mixed sodium and hydrogen zeolite, so to speak. Treatment of the usual hard water with this preparation results in removal of both temporary and permanent hardness with conversion of carbonate hardness to carbonic acid and of sulfate hardness to sodium sulfate. In this action, substantially all the calcium (and magnesium) base in the hard water is taken up by the lignite. The water is completely softened and the regeneration operation may be so conducted that the succeeding treated or effluent water contains sodium sulfate and is substantially free of carbonate alkalinity. This is effected by adjusting the proportions of acid and salt in the regenerating solution according to the carbonate and sulfate hardness in the raw water, salt being added in quantity sufficient to convert calcium compounds in the lignite to sodium compounds in a proportion corresponding to the relation of carbonate to sulfate hardness in the water to be treated.

In some special cases, as in brewing, making yeast, etc., a water is wanted containing calcium salts in solution but free of other cations. Calcium sulfate is the most desirable salt. With some waters, it is advantageous to pass the water through a bed of treated lignite under the present invention, removing all cations. To the extent that sodium sulfate is present, free sulfuric acid will be left in the water and, of course, $CO_2$. The acid water thus produced may be mixed with a further portion of hard water containing calcium carbonate as the main hardness giving constituent.

What I claim is:

1. The process of removing cations from water containing dissolved salts which comprises passing such water in contact with extensive surface areas of a rugged, acid resistant granular preparation of natural lignite as long as cations are readily removed from said water, interrupting the flow of water, regenerating the lignite by a weak acid wash and repeating the operation.

2. The process of claim 1 wherein the cations include sodium existing as carbonate or bicarbonate in softened water.

3. The method of claim 1 wherein the cations include calcium existing as carbonate or bicarbonate in hard water.

4. In removing cations from water containing dissolved salts, the process which comprises extracting granular lignite with acid to free it of soluble bases, flowing water to be freed of cations in contact with extensive surfaces of the acid treated lignite granules until they become charged with such cations, removing the cations therefrom by an acid wash and again flowing water to be freed of cations in contact with the lignite granules.

5. In the process of claim 7, regenerating the humin-containing material for reuse in water purification by treating the material with a dilute acid solution containing a sodium salt.

6. The process which comprises lessening the dissolved solids content of a water containing a bicarbonate by contacting the water with extensive surfaces of a granular solid acid-treated carbonaceous material having hydrogen exchanging characteristics, thereby removing the base of the bicarbonate.

7. In the purification of water containing dissolved salines, the process which comprises flowing such a water in contact with extensive surfaces of a rugged acid treated granular natural humin containing carbonaceous material physically capable of withstanding repeated acid regenerations to extract cations of said salines, interrupting the flow of water, washing the granules with a dilute acid solution and resuming the flow of water.

8. The process of claim 7 wherein the granular carbonaceous material is an acid-treated material of the coal group.

9. A process of reducing the dissolved solids content of water containing a bicarbonate which comprises contacting the water with material comprising granular lignite that has been treated with a solution of a strong acid, and thereafter regenerating said granular material with acid.

10. A process of reducing the dissolved solids content of sodium zeolite softened water which comprises contacting the water with a granular solid acid treated carbonaceous material having hydrogen exchanging characteristics and capable of removing the basic ions of said soluble salt by replacing the basic ions with hydrogen, and washing the granules with dilute acid to replace the hydrogen therein.

11. A process of preparing an acid solution from a solution containing a salt of the acid which comprises flowing the salt solution in contact with extensive surfaces of a granular solid acid treated carbonaceous material containing replaceable hydrogen and capable of extracting the cations of the salt in exchange for hydrogen, and thereafter replacing hydrogen in the granule surfaces by an acid wash.

12. In a process of conditioning water containing both sulfate and carbonate salts, the steps of passing the water over granular solid acid treated carbonaceous material containing replaceable by hydrogen to remove the cations of said salts and leave free sulfuric acid in the water, and uniting the acid water with alkaline water to neutralize said sulfuric acid.

13. As a new manufacture a granular mass capable of use in a pervious bed water softener to lessen the total solids in solution in water passed therethrough by removing cations therefrom, said mass consisting of rugged, acid-treated granules of a coal insoluble in water or dilute acid solutions and capable of repeated use and re-use in lessening the total solids of flowing water when regenerated with an acid wash intermediate said use and re-use.

14. In water purification, a method of lessening the total solids dissolved in sodium zeolite softened water which comprises as an alternating succession of steps flowing such water in contact with extensive surfaces of rugged acid-treated lignite granules thereby removing from the water cations of dissolved salts, regenerating the granules for re-use in water purification by washing them with dilute acid solution and again flowing softened water in contact with the regenerated granules.

15. A process of conditioning water as defined in claim 12 in which the alkaline water is sodium zeolite softened water.

WILLIAM VAUGHAN.

CERTIFICATE OF CORRECTION.

Patent No. 2,190,853.　　　　　　　　　　　　　　February 20, 1940.

WILLIAM VAUGHAN.

It is hereby certified that error appears in the printed specification of the above numbered patent requiring correction as follows: Page 4, first column, line 25, claim 12, strike out the word "by"; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.

CERTIFICATE OF CORRECTION.

Patent No. 2,190,853.　　　　　　　　　　　　　　February 20, 1940.

WILLIAM VAUGHAN.

It is hereby certified that error appears in the printed specification of the above numbered patent requiring correction as follows: Page 4, first column, line 25, claim 12, strike out the word "by"; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.